United States Patent [19]

Daniels

[11] Patent Number: 4,674,657
[45] Date of Patent: Jun. 23, 1987

[54] DISPENSER FOR A BEVERAGE PREPARED FROM A GRANULATED MATERIAL

[76] Inventor: Paul J. Daniels, Villa 89, 2733 Riverbluff Ct., Sarasota, Fla. 33581

[21] Appl. No.: 894,937

[22] Filed: Aug. 8, 1986

[51] Int. Cl.$^4$ .................. B67D 5/56; B65B 39/00
[52] U.S. Cl. .................. 222/129.4; 222/146.5; 222/131; 222/504; 222/640; 141/332
[58] Field of Search .......... 222/2, 640, 641, 129.1, 222/129.4, 129.3, 478, 148, 146.5, 409, 333, 460, 461, 131, 481.5, 504, 183; 312/236, 306, 350; 141/362, 361, 332, 333, 203, 204, 297–300, 331–345

[56] References Cited

U.S. PATENT DOCUMENTS

| | | | |
|---|---|---|---|
| 2,545,350 | 3/1951 | Fuld | 222/567 X |
| 3,196,628 | 7/1965 | Reynolds | 141/361 X |
| 3,266,670 | 8/1966 | Brooks et al. | 222/129.4 X |
| 3,531,019 | 9/1970 | Rodgers | 222/2 |
| 3,805,999 | 4/1974 | Syverson | 222/129.4 |
| 3,834,595 | 9/1974 | Brock et al. | 222/504 |
| 4,059,181 | 11/1977 | Greenfield, Jr. et al. | 222/129.4 X |
| 4,165,821 | 8/1979 | Martin et al. | 222/129.4 |
| 4,211,342 | 7/1980 | Jamgochian et al. | 222/129.4 |
| 4,359,176 | 11/1982 | Johnson | 222/504 X |
| 4,366,920 | 1/1983 | Greenfield, Jr. et al. | 222/145 |
| 4,378,078 | 3/1983 | Daniels | 222/183 |

Primary Examiner—Joseph J. Rolla
Assistant Examiner—Gregory L. Huson
Attorney, Agent, or Firm—Charles J. Prescott; Raymond H. Quist

[57] ABSTRACT

A dispenser of beverages prepared by combining hot or cold water with granulate is disclosed. The dispenser is designed to dispense granulate directly from the container in which it is purchased at retail or from the manufacturer by incorporating a support funnel which will hold the container inverted. The funnel is also designed to catch any spilled granulate and direct it towards the funnel spout. The dispenser may be combined with an instant hot water heater and/or a coin mechanism. A separate control compartment having a closure which is designed to make access more difficult is included in the housing. A more readily available compartment containing the funnel and the granulate container may also be locked. The dispenser provides a freshly prepared beverage without the need to wait for brewing and minimizes cleanup since no brewing container is required.

26 Claims, 8 Drawing Figures

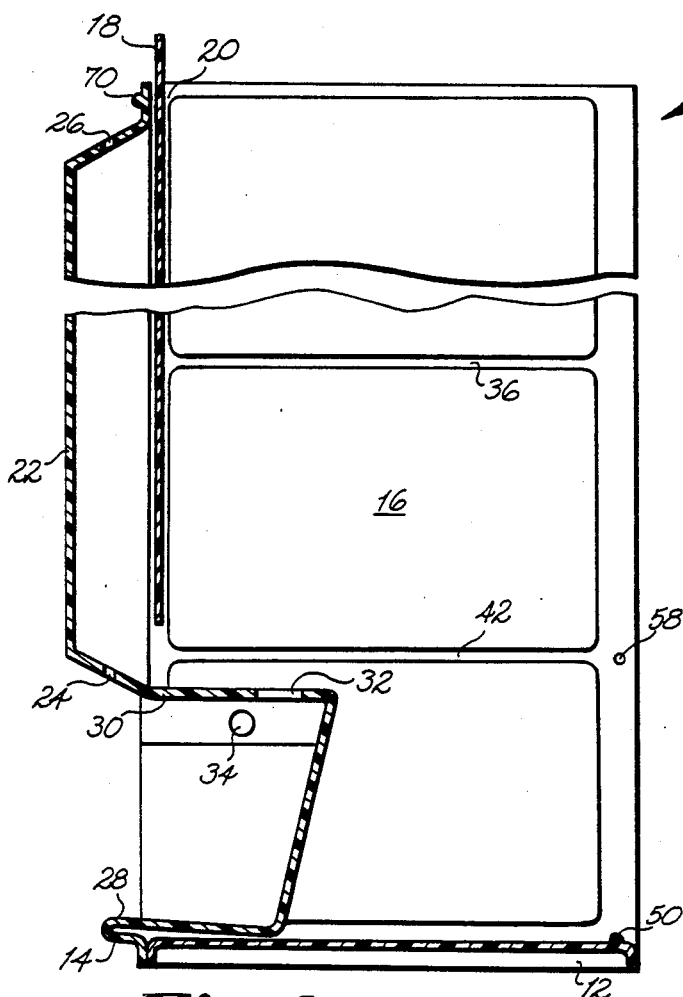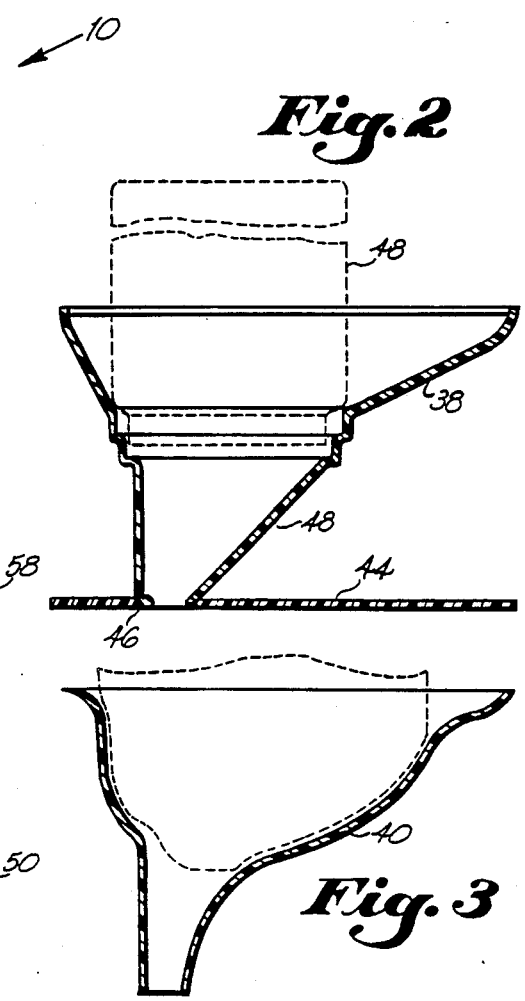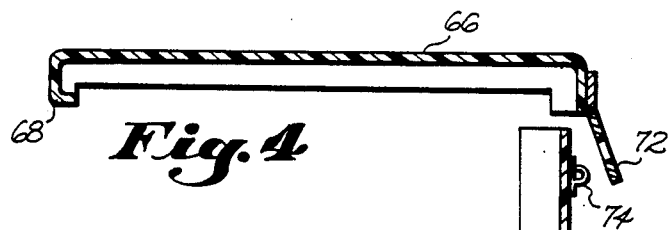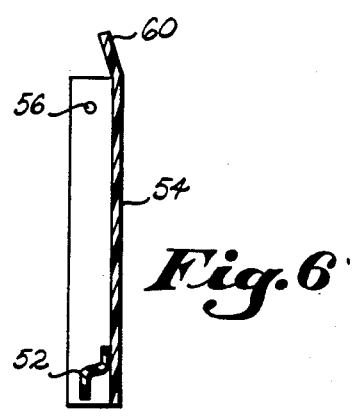

4,674,657

DISPENSER FOR A BEVERAGE PREPARED FROM A GRANULATED MATERIAL

BACKGROUND OF THE INVENTION

1. Field of the Invention

This invention relates generally to a dispenser of a beverage prepared from a granulated material, and more particularly to a dispenser which will dispense directly from the container in which the granulated material is sold and also provide a suitable amount of hot or cold water to form a beverage.

There are presently available at retail a large variety of beverage mixes in granular form. These include instant coffee, tea, regular or decaffinated, skim milk with vitamins A and D, soft drink mixes, soups, etc. These mixes are used not only in the home, but also in offices, dormitories and the like. Certain of the granulated mixes are used so frequently that a dispenser may be dedicated to their use. The need for hot or cold water to complete the beverage makes a dispenser which also provides the water a more useful device.

2. Description of Related Art

U.S. Pat. No. 4,378,078, Daniels, entitled "Granulated Materials Dispenser", discloses a previous invention of mine which is primarily intended to dispense granulated material from a hopper-like container which functions as both a shipping and storage container. This patent did not incorporate hot or cold water dispensing, nor did it provide structure for dispensing directly from a jar or the like in which the granulated material is sold.

U.S. Pat. No. 3,531,019, Rodgers, entitled "Food Dispensing Machine with Adjustable Auger", discloses special canisters for holding the granulated materials to be dispensed and does not dispense water.

U.S. Pat. No. 3,805,999, Syverson, entitled "Hot Drink Dispenser" uses special cartridges to hold the granulated material to be dispensed and provides hot water dispensing.

U.S. Pat. No. 4,165,821, Martin et al, entitled "Beverage Dispensing Machine for Mixing Granular Concentrate and Water", discloses a hopper which is filled with the granulated material to be dispensed and provides hot water dispensing.

It is therefore an object of this invention to provide a dispenser for a beverage which will support a granulated materials container in inverted position so that the granulate may be dispensed directly therefrom.

It is a further object of this invention to provide a dispenser for a beverage which will dispense water to be combined with the granulate.

In accordance with these and other objects, which will become apparent hereafter, the instant invention will now be described with reference to the accompanying drawings.

BRIEF DESCRIPTION OF THE DRAWINGS

FIG. 1 is a side elevation, in cross-section, of the housing of the dispenser of this invention;

FIG. 2 is a side elevation, in cross-section, of one funnel used in the invention together with a cooperating base plate;

FIG. 3 is a side elevation, in cross-section, of another funnel used in the invention;

FIG. 4 is a side elevation, in cross-section, of the housing top;

FIG. 5 is a side elevation, in cross-section, of the upper back cover of the housing;

FIG. 6 is a side elevation, in cross-section, of the lower back cover of the housing;

SUMMARY OF THE INVENTION

Figure 7:
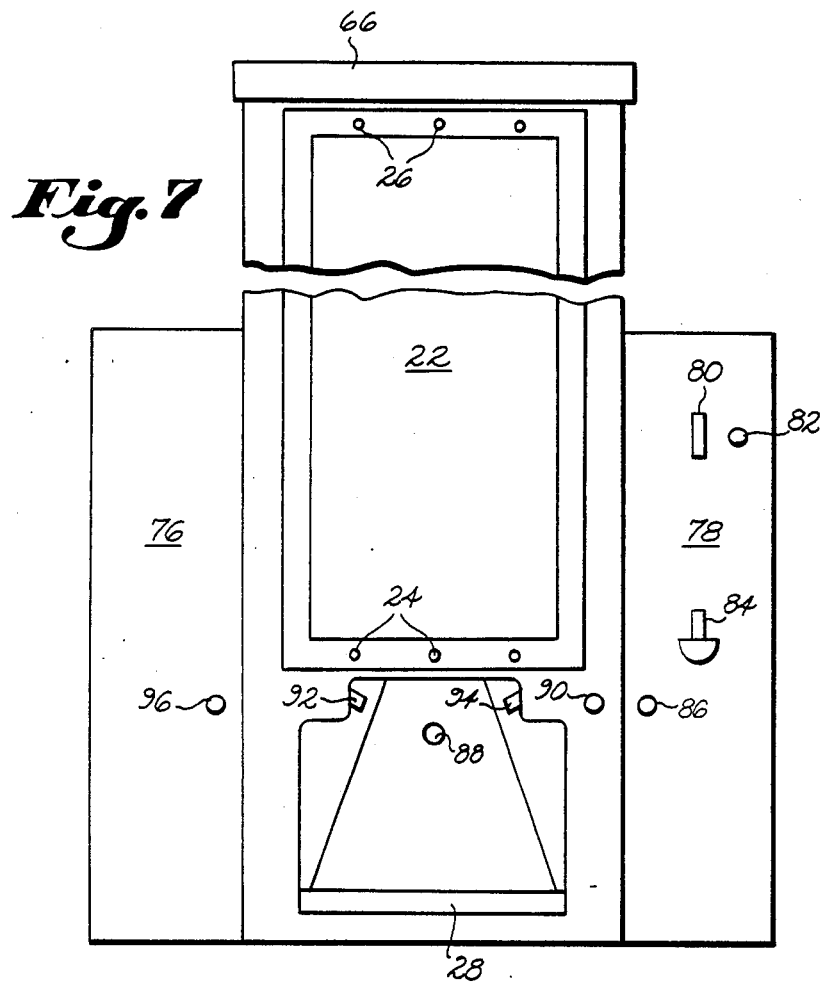
FIG. 7 is a front elevation of the dispenser.

The present invention provides a dispenser for the preparation of a beverage from a granulated material together with hot or cold water. In some cases, a user may want a dispenser for a single purpose, such as the preparation of instant coffee. Others may prefer the convenience of having both hot and cold water available from the dispenser even though the granulate in the dispenser is used with only cold or only hot water. This dispenser structure is versatile enough so that making the dispenser to fit these various desires is routine. One embodiment, therefore, employs a funnel designed to support instant coffee jars of varying dimensions in an inverted fashion. Another embodiment utilizes a funnel designed to support a bag such as the five pound bag in which skim milk granulate is vended. The funnels are supported along the edges at the top and are held in position by the positioning of the spout of the funnel in the dispensing opening of a base plate. The design also includes a chimney which operates passively when hot water is dispensed to convey hot water vapor away from the location where the granulate and water are dispensed. An available option is a coin mechanism for use where it is desired to requirement payment for the beverage. This mechanism may be defeated when desired by the use of a key. A control mechanism is provided for dispensed the proper amount of granulate and water.

DETAILED DESCRIPTION OF THE INVENTION

The housing used in the invention is shown in the preferred form as being primarily of plastic in a configuration which may be vacuum formed or molded. It should be understood, however, that other materials such as aluminum or stainless steel may also be used to produce essentially an identical structure which performs the same functions. Referring to FIG. 1, a main housing assembly 10 is shown which is formed of a base 12 and the front 14 and far sidewall 16 which are formed together. Also shown in FIG. 1 is partition 18. Partition 18 is shown partially withdrawn from channel 20. Channel 20, it will be observed, results from wall regions which are depressed into the structure to provide stiffening. Such depressed regions, or contrarily, raised or extended areas, may be readily formed in a sheet of constant thickness wherever desired to provide grooves or ridges for other purposes when using vacuum forming. Partition 18, together with extended wall 22, form a vertically extending chimney having holes 24 at the bottom and holes 26 at the top. This chimney is used to convey hot water vapor away from the region of the lower holes 24. These lower holes 24 are adjacent to the container filling station of the dispenser. The container filling station has an inclined bottom platform 28 and an upper partition 30. A dispensing opening 32 for granulate is included in upper partition 30. An opening 34 is provided in the side wall of the container filling station for a nozzle.

A channel 36 in the side wall of the housing is used to support a funnel, such as funnel 38 of FIG. 2, or funnel 40 of FIG. 3. These funnels are provided with an outwardly extending edge which will fit in channel 36. Obviously a ledge on the side wall could be used as a funnel support instead of the channel. A channel 42 in the side wall of the housing is used to support base plate 44 of FIG. 2. Base plate 44 serves as a partition between the upper and lower parts of the housing. When base plate 44 is installed in the housing, dispensing opening 46 will overly dispensing opening 32.

It will be observed that spout 48 of funnel 38 is positioned in dispensing opening 46 of base plate 44. This positioning serves to keep funnel 38 (or funnel 40) in the proper location for dispensing and prevents its inadvertant removal.

FIG. 2 shows jar 48 supported in "spill proof" funnel 38. Funnel 38 is formed to provide a plurality of vertically spaced circular ridges so that a variety of jars having different diameter necks can be positioned inverted in the funnel. The upper edges of both funnel 38 and 40 are sized to fill the horizontal cross-sectional area so that any granulate which may be spilled when changing containers will fall in the funnel. The sides of these funnels are sloped so that any spilled granulate will flow towards the funnel opening.

"Spill proof" funnel 40 is designed to support a bag of granulate, such as a five pound bag of skim milk. Funnel 40 is therefore made to have a large basin type configuration. It will be evident that funnels having other cross-sections may be substituted while still retaining the horizontal dimensions to catch spilled granulate, and still providing a spout in the proper location.

Base 12 includes a laterally extending elevated ridge 50 which cooperates with a laterally extending lip 52 on lower rear cover 54 shown in FIG. 6. Lower rear cover 54 has a screw hole 56 which is positioned to be in line with screw hole 58 on the side wall 16 of the main housing shown in FIG. 1. With lip 52 positioned behind ridge 50, and screws, such as Phillips head screws, installed in the screw holes, lower rear cover 54 will be firmly secured and will hold base plate 44 securely within the structure. A completely enclosed compartment is thereby formed within which the electrical controls of the dispenser are disposed.

Lower rear cover 54 has a laterally extending, inwardly protruding top edge 60. Top edge 60 cooperates with laterally extending lip 62 of upper rear cover 64 shown in FIG. 5 to hold the lower part of upper rear cover 64 in position. Top cover 66 of FIG. 4, has a laterally extending lip 68 which cooperates with a laterally extending ridge 70 at the top front of the main housing 10. With lip 68 placed under ridge 70, top cover can be brought down to enclose the top edge of upper rear cover 64. This completes the enclosure.

Upper rear cover 64 preferably extends down far enough so that its sides will cover the screws used to hold lower rear cover 54 in position. This arrangement deters tampering. Also hasp 72 on top cover 66 and staple 74 on upper rear cover 64, or the like, can be used to provide a locking capability for the total housing.

Turning to FIG. 7, a front elevation is depicted showing the dispenser in the center, flanked on the left by a housing 76 containing an instant hot water heater. For the purposes of this invention, hot water at a temperature of a minimum of 185 degrees Fahrenheit would be suitable for hot beverages. Such instant hot water heaters are well known and require a supply of cold water and electricity for operation. On the right of the dispenser is a housing 78 which includes a coin mechanism having a slot 80 for receiving a coin, a coin release button 82 and a coin return slot 84. Also a key operated device 86 may be provided for disabling the coin mechanism so that dispensing can occur without the deposit of a coin whenever this capability is desired.

The dispenser container filling station is shown as including on its rear wall a container operated switch 88. Because the dispenser of this invention is a self-service type which does not dispense a container, it is necessary that the user position a container against switch 88 before dispensing of granulate or water will occur. If the granulate to be dispensed is for a beverage requiring hot water, the instant hot water heater 76 would be a part of the total dispenser. In this case, enabling switch or button 90 would be pressed to prepare the dispenser to dispense first the granulate, and then the hot water. No dispensing would occur, however, until a container was positioned to close actuating switch 88. The granulate is dispensed from the dispensing opening above the container and hot water would be dispensed from nozzle 92 at an angle into the container so as to swirl around the interior of the container and dissolve the granulate.

If the dispenser is set to dispense a granulate requiring the addition of cold water to form the beverage, enabling switch 90 would similarly be pressed to prepare the dispenser to dispense first the granulate and then the cold water. The cold water would be dispensed from nozzle 94 at an angle into the container. Instant hot water heater 76 would be used in this case only for use with a tea bag or other non-dispensed material and would be actuated by switch 96. It will be recognized that coin mechanism 78 or hot water heater 76 or both, may be dispensed with when not required for the purpose for which the dispenser is to be used.

Figure 8:
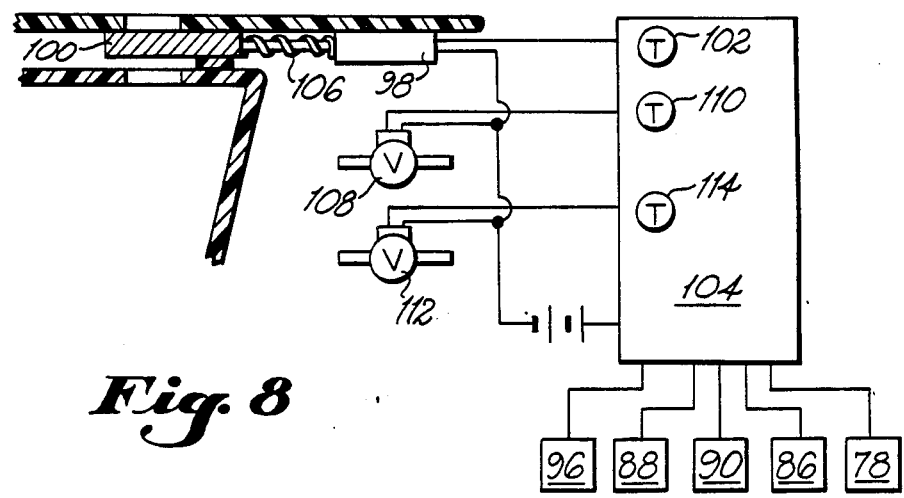
FIG. 8 is a schematic showing the controls employed.

Referring next to FIG. 8, three electromechanical components are utilized to control dispensing assuming the embodiment shown in FIG. 7 is the dispenser. A solenoid 98 is connected to slide 100 to pull this stainless steel valve open. The duration of the energization of solenoid 98 is adjusted by time control 102 on microprocessor board 104. Slide 100 is supported under base plate 44 for reciprocal movement. Spring 106 is compressed when solenoid 98 is energized, and returns slide 100 to close the dispensing opening 46 in base plate 44 when solenoid 98 is no longer energized. A first solenoid operated valve 108 is provided in the hot water line leading to nozzle 92 from instant hot water heater 76. Time control 110 on board 104 controls the duration of the opening of valve 108 for the predetermined time desired to dispense the required hot water. Similarly, a second solenoid operated valve 112 is provided in the cold water line leading to nozzle 94. Time control 114 on board 104 permits adjustment of the duration of opening of valve 112 for the desired period. Solenoid operated devices such as these are well known and commercially available. Microprocessor board 104 also receives as an input an indication from key operated switch 86 advising whether the coin mechanism is in use or disabled. If the coin mechanism is in use, mechanism 78 signals board 104 when a coin has been properly deposited. The logic on board 104 which electromechanical devices should be energized, the time of energization as set by the adjustable timer controls and the order in which energization is to occur.

Dispensers of beverages have heretofore been used in commercial environments where they are serviced by trained professionals to replenish the granulates and clean the dispensers. The present device is designed to be refilled by a non-professional merely by removing the empty container and replacing it with a new one. The desirability of keeping the interior of the housing is well recognized. The dispenser in U.S. Pat. No. 3,805,999 provides a fan for this purpose. The present invention dispenses both hot and cold water from nozzles positioned outside the housing in the container filling station. Moreover, the chimney provided conveys hot water vapor passively from the container filling station out the top of the dispenser. The jar support funnel is designed to receive and hold jars having openings of different diameters while still providing a seal to keep the contents dry. The addition of spilled granulate retention areas around the funnel opening assists in keeping the interior of the housing immaculate. The housing is designed to make access to the control compartment more difficult by having a separate cover for this compartment which requires a tool to open. Access for replacing containers is more ready, but may also be controlled by using a lock. Provision has been made for a dispenser which can be coin operated, or may have the coin operation mechanism disabled when desired, or may have no coin mechanism at all.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A dispenser for beverages made from granulated materials comprising:
    a vertically extending, generally rectilinear housing;
    a horizontal plate dividing said housing into an upper compartment and a lower portion;
    said upper compartment having an interior defined by side walls;
    said lower portion having a container filling station in the front and a control compartment in the rear;
    said container filling station having an upper partition and a bottom platform;
    a granulated materials dispenser opening in said upper partition;
    a granulated materials dispenser opening in said horizontal plate overlying said dispenser opening in said upper partition;
    funnel means in said upper compartment for supporting a granulated materials container in an inverted position;
    said funnel means having a dispensing spout;
    said dispensing spout positioned above said dispensing opening in said upper partition;
    said funnel means having spilled granule retention areas extending laterally to juxtapose the side walls of said upper compartment;
    dispensing opening closure means positioned between said dispensing opening in said horizontal plate and said dispensing opening in said upper partition of said container filling station;
    a nozzle positioned in said container filling station;
    valve means for controlling flow through said nozzle;
    control means for opening said dispensing opening closure means for a first predetermined time and for opening said valve means for a second predetermined time; and
    switch means for actuating said control means.

2. A dispenser in accordance with claim 1 wherein:
    said funnel means includes a plurality of vertically spaced circular ridges for holding jars having different diameters.

3. A dispenser in accordance with claim 1 wherein:
    said funnel means extends horizontally to the walls of said upper compartment.

4. A dispenser in accordance with claim 1 wherein:
    said funnel means has a basin type configuration.

5. A dispenser in accordance with claim 1 further including:
    a lower rear cover for said control compartment;
    said lower rear cover extending high enough to secure said horizontal plate in said housing;
    said lower rear cover being secured by fasteners requiring a tool for removal.

6. A dispenser in accordance with claim 1 wherein:
    said housing is vacuum formed plastic and includes spaced depressed rectilinear side areas; and
    said spaced depressed rectilinear side areas form interior horizontal channels for supporting said funnel means and said horizontal plate.

7. A dispenser in accordance with claim 1 wherein:
    said dispenser includes an instant hot water heater; and
    said nozzle is connected to said instant hot water heater.

8. A dispenser in accordance with claim 7 further including:
    a second nozzle.

9. A dispenser in accordance with claim 1 wherein:
    said switch means includes a first switch for enabling the dispensing of a beverage component and a second switch for actuating the dispensing.

10. A dispenser in accordance with claim 9 wherein:
    said second switch is operated by a container pressed against it.

11. A dispenser in accordance with claim 1 further including:
    coin mechanism means for requiring payment for dispensing.

12. A dispenser in accordance with claim 11 wherein:
    said coin mechanism includes a key operated disabling device to permit dispensing without payment.

13. A granulated materials dispenser for beverages comprising:
    a vertically extending, generally rectilinear housing;
    a horizontal partition dividing said housing into an upper compartment and a lower compartment;
    said lower compartment having a container filling station in the front and a control compartment in the rear;
    said container filling station having a rear wall, side walls, a bottom platform and an upper partition;
    said upper partition having a rear portion underlying said horizontal partition and a front portion extending beyond said horizontal partition;
    a dispensing opening in said horizontal partition overlying a corresponding dispensing opening in said upper partition of said front container filling station;
    a rear closure for said control compartment;
    a rear closure for said upper compartment;
    side walls for said upper compartment;
    a front wall for said upper compartment;
    a funnel having a dispensing spout;

funnel support means in said upper compartment for removably supporting said funnel with said spout positioned in said dispensing opening in said horizontal partition;

said funnel having a granulated material container support portion and a spilled granulated material retaining portion;

said spilled granulated material retaining portion extending to juxtapose said side walls of said upper compartment, said front wall of said upper compartment and said rear closure of said upper compartment;

dispensing opening closure means positioned between said dispensing opening in said horizontal partition and said dispensing opening in said upper partition of said container filling station;

a nozzle positioned in said container filling station and oriented to point at an angle into a container placed in said container filling station;

valve means for controlling flow through said nozzle;

control means for opening said dispensing opening closure means for a first predetermined time and for opening said valve means for a second predetermined time; and switch means for actuating said control means.

14. A dispenser in accordance with claim 13 wherein: said funnel means includes a plurality of vertically spaced circular ridges for holding jars having different diameters.

15. A dispenser in accordance with claim 13 wherein: said funnel means has a basin type configuration.

16. A dispenser in accordance with claim 13 wherein: said rear closure for said control compartment extends high enough to secure said horizontal partition in said housing; and said rear closure for said control compartment is secured by fasteners requiring a tool for removal.

17. A dispenser in accordance with claim 13 wherein: said housing is vacuum formed plastic and includes spaced depressed rectilinear side areas; and said spaced depressed rectilinear side areas form interior horizontal channels for supporting said funnel and said horizontal partition.

18. A dispenser in accordance with claim 13 wherein: said dispenser includes an instant hot water heater; and said nozzle is connected to said instant hot water heater.

19. A dispenser in accordance with claim 18 further including:
a second nozzle.

20. A dispenser in accordance with claim 13 wherein: said switch means includes a first switch for enabling the dispensing of a beverage component and a second switch for actuating the dispensing.

21. A dispenser in accordance with claim 20 wherein: said second switch is operated by a container pressed against it.

22. A dispenser in accordance with claim 13 further including:

coin mechanism means for requiring payment for dispensing.

23. A dispenser in accordance with claim 22 wherein: said coin mechanism includes a key operated disabling device to permit dispensing without payment.

24. A dispenser for beverages made from a granulate comprising:

a vacuum formed, vertically extending, generally rectilinear housing having a front and side wall section, a base, a lower rear cover, an upper rear cover and a top;

said side walls having vertically spaced, generally rectangular depressed areas which form channels on the interior of said housing;

a depressed container filling station in the lower part of said front;

a control compartment behind said container filling station;

a horizontally extending partition contained in horizontal channels formed by said generally rectangular depressed areas on said side walls;

said horizontally extending partition having a portion overlying said container filling station and a portion overlying said control compartment;

said container filling station having an upper partition defining a dispensing opening;

said horizontally extending partition having a dispensing opening overlying said dispensing opening in said container filling station;

dispensing opening closure means for opening and closing said dispensing opening in said horizontally extending partition;

funnel means supported by horizontal channels formed by said generally rectangular depressed areas for supporting an inverted granulate container;

said funnel means having a dispensing spout located in said dispensing opening in said horizontally extending partition;

said funnel means having spilled granule retention areas extending into said channels whereby granules are prevented from falling outside of said funnel means;

nozzle means positioned to aim at a container in said container filling station;

valve means for controlling flow through said nozzle means;

control means for opening said dispensing opening closure means for a first predetermined time and for opening said valve means for a second predetermined time; and switch means for actuating said control means.

25. A dispenser in accordance with claim 24 wherein: said funnel means includes a plurality of vertically spaced circular ridges for holding jars having different diameters.

26. A dispenser in accordance with claim 24 wherein: said funnel means has a basin type configuration.

* * * * *